United States Patent [19]
Toney et al.

[11] Patent Number: 5,520,764
[45] Date of Patent: May 28, 1996

[54] CORONA TREATMENT OF ANTIFOG FILM LAMINATES

[75] Inventors: Gloria G. Toney, Greer; Robert A. Young, Fountain Inn; David V. Babb, Duncan, all of S.C.

[73] Assignee: W.R. Grace & Co.-Conn., Duncan, S.C.

[21] Appl. No.: 418,744

[22] Filed: Apr. 7, 1995

Related U.S. Application Data

[62] Division of Ser. No. 60,394, May 11, 1993.

[51] Int. Cl.$^6$ .................................................. B29C 47/04
[52] U.S. Cl. ................. 156/244.17; 156/244.23; 156/272.6; 156/324
[58] Field of Search ............... 156/244.11, 244.17, 156/244.23, 272.2, 272.6, 324

[56] References Cited

U.S. PATENT DOCUMENTS

| | | | |
|---|---|---|---|
| 2,859,480 | 11/1958 | Berthold et al. | 156/272.6 |
| 3,067,119 | 12/1962 | Ramaika | 156/272.6 |
| 3,541,040 | 11/1970 | Eastes et al. | |
| 4,082,877 | 4/1978 | Shadle. | |
| 4,120,716 | 10/1978 | Bonet. | |
| 4,623,587 | 11/1986 | Ito et al. | |
| 4,764,028 | 8/1988 | Wood et al. | |
| 4,788,105 | 11/1988 | Mueller et al. | |
| 4,854,999 | 8/1989 | Schirmer | 156/272.6 |
| 5,118,561 | 6/1992 | Gusavage et al. | |

FOREIGN PATENT DOCUMENTS 1289522  9/1991  Canada.

OTHER PUBLICATIONS

Guide To Corona Film Treatment, von der Heide et al, Modern Plastics, May 1961, FIG. 12.

Primary Examiner—Michael W. Ball
Assistant Examiner—Richard Crispino
Attorney, Agent, or Firm—Mark B. Quatt; William Lee

[57] ABSTRACT

A laminate comprises a first substrate including a first layer of a blend of a polyolefin and an antifogging agent, and a bonding layer of polyolefin, preferably an ethylene unsaturated ester copolymer or low density polyethylene; a second substrate bonded to the bonding layer of the first substrate and comprising polyester or nylon; and a conventional adhesive between the first and second substrates; the bonding layer pre-treated by corona discharge before wind-up; and again treated by corona discharge before lamination. The laminates of the present invention exhibit much improved bond strength compared with conventional laminates.

2 Claims, 1 Drawing Sheet

CORONA TREATMENT OF ANTIFOG FILM LAMINATES

This is a divisional application of application Ser. No. 060,394, filed May 11, 1993.

BACKGROUND OF THE INVENTION

This invention relates generally to the art of packaging films and more particularly to films useful in the packaging of food and other products.

It is common practice in packaging many goods, including food items, to use what is generally known as thermoforming. In the thermoforming process, a forming web made from a flexible thermoplastic material is advanced to cover a forming die, and heated and drawn down by vacuum into the forming die to form a film cavity. A food or other product to be packaged is inserted into the film cavity, and covered with a non-forming web fed from a second roll stock. The forming and non-forming webs are sealed to form a finished package. The non-forming web is typically referred to as lidstock.

In some applications, instead of forming a bottom web, a preformed tray is used. Polystyrene foam rigid packaging trays are well known. A lidstock is often used in combination with a foam tray to package a food or other item.

Sometimes the foam tray includes a barrier layer to provide longer shelf life to the packaged product. This barrier layer is sometimes supplied by adhering a flexible oxygen barrier film or layer to a polystyrene foam sheet prior to thermoforming into trays, or the oxygen barrier film is adhered to the tray after the tray has been made.

Laminates useful for lidstock applications typically must meet stringent requirements imposed by the particular food or other article to be packaged. The package must be capable of adequately protecting the food item after packaging and through the distribution cycle until the packaged product reaches the end user at point of sale.

The flexible material must also have sufficient abuse resistance to physical and mechanical abuse imposed by the packaging system.

Yet another requirement of packaging material, especially in lidstock applications, is good heat sealability with respect to the tray.

Limited oxygen transmission through the packaging material under both low and high humidity conditions is an essential feature of a packaging material for long-term storage of oxygen sensitive food products. This oxygen barrier feature should maintain the packaged food products for an extended period.

It is often useful to use antifogging agents in lidstock materials in order to reduce the undesirable aesthetic effect of droplets of water on the interior surface of the packaging material. For example, the Cryovac Division of W. R. Grace & Co.—Conn. currently offers-commercially a lidstock laminate having a first substrate and second substrate, in which the sealant layer of the first substrate is a blend of linear low density polyethylene and an antifogging agent. The first substrate also includes an intermediate layer of an EVA/antifogging agent blend, and a bonding layer of EVA. The first substrate is bonded, at its bonding layer, to a second substrate of saran coated polyester. Unfortunately, it has been found that when antifogging agents are present in one or more layers of certain laminates used in lidstock applications, a relatively weak intersubstrate bond is formed when the film (first substrate) containing the antifogging agent is adhered by conventional adhesive lamination to a polyester or saran coated polyester substrate (second substrate). This is found to be true even if the bonding layer of the antifog lidstock material does not itself contain an antifogging agent, as in the case of the present commercial product. It is believed that the antifogging agent is present in the bonding layer by reason of migration from other layers of the film, and also from skin-to-skin contact of a single wound film roll prior to lamination. To cure this deficiency in the existing product, it has been found necessary to bind the first and second substrates by a separate extrusion lamination step. Low density polyethylene is used as the bonding agent.

It is known to extrude a first film substrate, wind up the extruded film, and later expose one surface of the film to corona discharge just prior to conventional lamination of the substrate to a second substrate. The inventors have found that even with the corona treatment step, only weak intersubstrate bonds can be formed if the first substrate includes an antifogging agent. This is true even if the agent is not originally present in the film layer to be bonded to the second substrate.

The inventors have discovered that the problem of a weak intersubstrate bond can be solved by corona pre-treatment, soon after extrusion, of the bonding layer of a film containing an antifogging agent. This, along with corona treatment during the lamination process, results in greatly improved intersubstrate bond strength between the film and a substrate which is conventionally adhered to the film. The bond strength of the first and second substrate are of course very important in actual end use packaging applications. Delamination of the lidstock material could cause damage to the package contents during distribution and storage of the package, because of loss of oxygen barrier properties. Package appearance could also be adversely affected.

Of interest is U.S. Pat. No. 4,788,105 issued to Mueller et al. which discloses a thermoplastic laminate with two substrates, one of the substrates having polyester and one of the substrates having a layer of LLDPE, and a bonding layer of ethylene vinyl acetate copolymer.

Also of interest is U.S. Pat. No. 5,118,561 issued to Gusavage et al. which discloses a barrier foam tray.

Also of interest is Canadian Patent 1,289,522 (Davis) discussing thermoformed food packaging.

It is an object of the present invention to provide a thermoplastic laminate suitable for the packaging of food and other products.

It is a further object of the present invention to provide a thermoplastic laminate useful as lidstock to be used in combination with foam trays, such as oxygen barrier foam trays.

It is still another object of the present invention to provide a thermoplastic laminate which exhibits improved intersubstrate bond strength.

SUMMARY OF THE INVENTION

A laminate comprises a first substrate including a first layer of a blend of a polyolefin and an antifogging agent, and a bonding layer of a polyolefin; a second substrate bonded to the bonding layer of the first substrate and comprising polyester or polyamide; and a conventional adhesive between the first and second substrates; the laminate made by the steps of blending a polyolefin and an antifogging agent; coextruding the blend with a layer of a polyolefin to form a first substrate; corona pre-treating an exposed surface of the bonding layer soon after the coextrusion step; winding up the first substrate onto a roll; unwinding the first substrate; corona treating the pre-treated surface of the first substrate; applying a conventional adhesive to the treated surface of the first substrate, or the second substrate; and adhering the second substrate to the treated surface of the first substrate.

A process for making a laminate comprises blending a polyolefin and an antifogging agent; coextruding the blend with a layer of a polyolefin to form a first substrate; corona pre-treating an exposed surface of the bonding layer soon after the coextrusion step; winding up the first substrate onto a roll; unwinding the first substrate; corona treating the pre-treated surface of the first substrate; applying a conventional adhesive to the treated surface of the first substrate, or to a second substrate comprising a polyester or nylon; and adhering the second substrate to the treated surface of the first substrate.

DEFINITIONS

The term "ethylene alpha olefin copolymer" (EAO) as used herein includes such heterogeneous materials as linear low density polyethylene [LLDPE], and very low and ultra low density polyethylene [VLDPE]; and homogeneous materials such as metallocene catalyzed polymers such as those supplied by Exxon, and Tafmer materials supplied by Mitsui. These materials generally include copolymers of ethylene with one or more comonomers selected from $C_4$ to $C_{10}$ alpha olefins such as butene-1, hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. "LLDPE" as defined herein has a density usually in the range of from about 0.916 grams per cubic centimeter to about 0.940 grams per cubic centimeter. EAO available from Dow as Insite(TM) is also included as a type of ethylene alpha olefin copolymer useful in the present invention.

The term "polyolefin" is used herein in its stricter sense to mean a thermoplastic polymer derived from simple olefins. Among these are polyethylene, polypropylene and copolymers thereof with olefinic comonomers. For example, the EAO materials defined above are included herein as examples of what is termed "polyolefin". Some of these may be considered a linear ethylene copolymer with a comonomer comprising such materials as butene, hexene or octene. The term "polyolefin" is also used herein in a broader sense to include copolymers and terpolymers of ethylene with comonomers that are not themselves olefins, such as vinyl acetate (e.g. EVA).

The term "antifogging agent" is used herein to describe substances that reduce or prevent water from condensing on a plastic film in the form of water droplets. These agents are typically surface-effect chemicals that lower the surface tension of water. Because these agents are typically blended with the host polymer, they migrate to the surface of the film to create the favorable antifogging effect. Examples include fatty acid esters of glycerol, sorbitan, ethoxylated sorbitan, fatty alcohols, and proprietary products.

The terms "ethylene vinyl acetate copolymer", "EVA" and the like are used herein to refer to a copolymer formed from ethylene and vinyl acetate monomers wherein the ethylene derived units in the copolymer are present in major amounts, preferably between about 60% and 98% by weight, and the vinyl acetate derived units in the copolymer are present in minor amounts, preferably between about 2% and 40% by weight. Other ethylene unsaturated ester copolymers can also be used to some extent in the practice of this invention, depending on process conditions and desired end use. These include for example ethylene methyl acrylate copolymer, and ethylene butyl acrylate copolymer.

BRIEF DESCRIPTION OF THE DRAWINGS

Details of the present invention are provided by reference to the drawing figures wherein.

DESCRIPTION OF THE PREFERRED EMBODIMENTS

Figure 1:
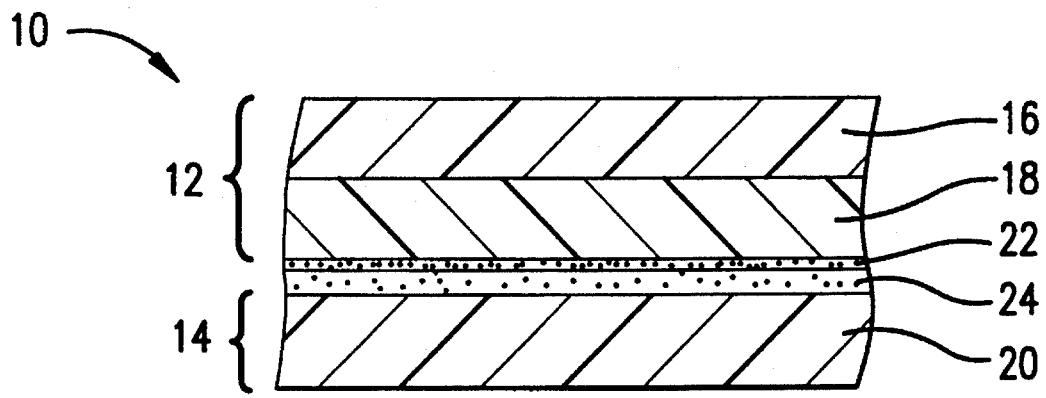
FIG. 1 is a schematic cross section of an embodiment of a multilayer laminate of the invention.

The structure depicted in FIG. 1 is directed to a thermoplastic laminate 10 having a first substrate 12 and second substrate 14.

First substrate 12 is a multilayer film having a first layer 16 and a bonding layer 18. The first layer 16 would preferably function as the sealant layer in a lidstock made from the inventive laminate, i.e. would be the layer to be sealed to the barrier foam tray or thermoformed tray. It is preferably a polyolefin blended with an antifogging agent. A preferred polyolefin is an EAO as defined above. A preferred antifogging agent is PA 8112 from ICI, having a proprietary composition. This antifogging material is sold under the trademark ATMER. Antifogging agents are blended with the polyolefin in percentages preferably ranging from 0.1 to 20% by weight active antifogging agent, more preferably 0.5 to 15% by weight, and most preferably 0.5 to 10% by weight. The term "active" is used here because some commercial antifogging agents are actually produced and sold in masterbatch form, so that the active antifogging agent forms a relatively small part of the commercial product. Those skilled in the art will understand that increasing amounts of antifogging agent will result in added raw material expense, poorer film clarity and sealability, and difficulties in processing.

The first substrate of the present invention is preferably a hot blown material, manufactured by conventional means. The first substrate can also be made by other conventional means, such as by a slot die process.

Bonding layer 18 is a polyolefin, preferably an ethylene unsaturated ester copolymer, more preferably EVA. Ethylene methyl acrylate and ethylene methyl acrylate, as well as low density polyethylene can also be used.

Layer 22 of FIG. 1 illustrates the corona pre-treatment of first substrate 12. Although corona treatment is essentially a surface phenomenon and condition of the material obtained by passing the substrate through a corona discharge station, it is illustrated in FIG. 1 as a separate layer in order to highlight the treatment step in the production of the present laminate.

Corona pre-treatment is done ideally on-line immediately after extrusion of the film, or within a short time after extrusion in the case of off-line pre-treatment. Preferably, this step, if done off-line, is done between about 1 hour and 30 days after extrusion.

After pre-treatment, the first substrate is wound up and stored for the subsequent lamination step.

Prior to lamination, the first substrate is again subjected to a corona treatment. This preferably occurs between one day and two weeks after the first pre-treatment. The second corona treatment is done by unwinding the pre-treated film from the film roll, and passing it through a corona discharge station.

The second corona treatment is preferably done at the time the first substrate is laminated to the second substrate.

After the second corona treatment, the now treated film is passed to a conventional lamination station where a conventional lamination adhesive, such as polyurethane, is applied to the treated surface of the boning layer of the first substrate, or more preferably to the surface of the second substrate to be bonded to the first substrate. The substrates are brought together by conventional means to form the final laminate.

The inventors have discovered that the second treatment alone does not provide adequate intersubstrate bonding. When combined with the corona pre-treatment, however, much improved intersubstrate bonding occurs. The inventors theorize that the pre-treatment of the surface of bonding layer 18 reduces the tendency of the bonding layer to attract antifogging agent from the surface of layer 16 during skin-to-skin contact of the first substrate on itself when wound up in a roll after extrusion.

Layer 24 of FIG. 1 illustrates the application of a conventional lamination adhesive, such as a polyurethane adhesive, to the surface of layer 18.

Second substrate 14 comprises a polyester or polyamide layer 20, optionally with a saran coating (not shown) on the surface of the layer 20 facing the first substrate 12. The polyester layer 20 would typically be the outer, abuse resistant layer of a final lidstock made from the present laminate. The optional saran coating adds oxygen barrier properties to the lidstock material, making it particularly useful in connection with the use of barrier foam trays.

Figure 2:
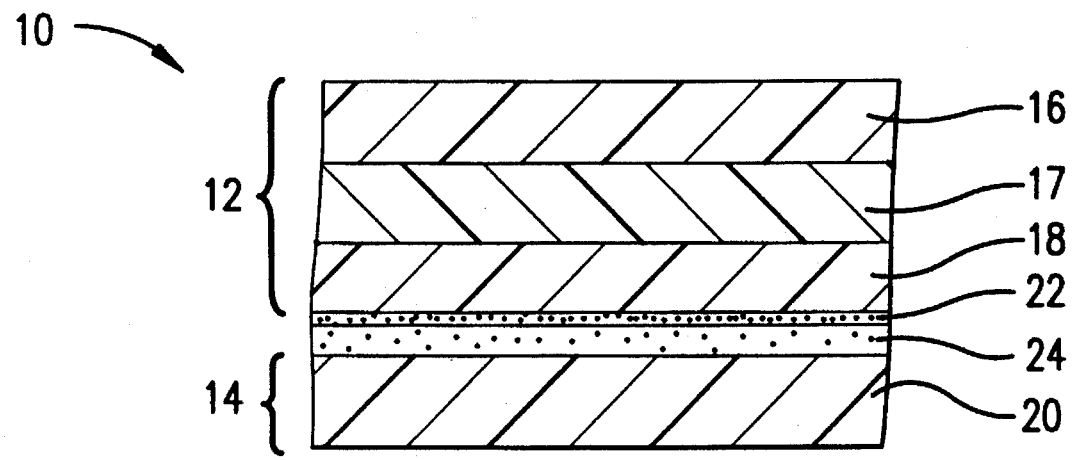
FIG. 2 is a schematic cross section of a preferred embodiment of a multilayer laminate in accordance with the invention.

In FIG. 2, a laminate like that of FIG. 1 is shown, but in which an additional layer 17 is present in the first substrate. Layer 17 can be made of any of the materials disclosed for layer 16. An antifogging agent may be blended in the host resin of layer 17 in the same or different proportions as that shown for layer 16 of FIG. 1. Either layer 16 or layer 17 of FIG. 2 will have the polymer/antifogging agent blend. Preferably, both layers will have such a blend in order to maximize the amount of antifogging agent available for migration to the surface of layer 16.

Additional layers may be included in the first substrate 12. For example, an oxygen barrier layer (not shown) of a material such as ethylene vinyl alcohol copolymer may be included as an intermediate layer in first substrate 12 to supplement or replace the use of a saran coating on second substrate 14. Other layers, including polymeric adhesive layers as needed, can also be included in first substrate 12.

Likewise, additional layers may be added to second substrate 14 as needed or required for specific end use applications.

The invention may be further understood by reference to the following examples.

EXAMPLE 1

A film 12 is prepared by blending 87% (all percentages by weight) of LLDPE (Dowlex 2244A), 8% LLDPE masterbatch having an LLDPE base resin blended with a silica antiblocking agent, and 8% antifogging agent masterbatch (PA 8112 from ICI). The antifogging agent used here is believed to contain about 20% active agent, so that about 1.6% active antifogging agent is present in the first layer. This sealant blend layer, shown as layer 16 in FIGS. 1 and 2, is hot blown with a bonding layer 18 comprising EVA (PE 1325 from Rexene). The first substrate 12, after coextrusion, is pre-treated at its bonding layer's exposed surface by corona discharge by conventional means. The treated substrate is then further processed by winding up the pre-treated film, and storing the wound-up film for further lamination. After a storage period of two weeks, the film is unwound and again corona treated. A conventional lamination adhesive, such as polyurethane, is then applied to the treated surface (layer 18 of FIG. 1) of first substrate 12.

A second substrate 14, preferably comprising a polyester, is then adhered to the treated and adhesive coated first substrate 12 to produce the final laminate. Layer 20 can be saran coated on the surface facing the first substrate, in the event that an oxygen barrier laminate is desired. This saran coating of course is done prior to the lamination step.

EXAMPLE 2

A laminate like that of Example 1 was made, by the same process steps, but including an additional layer 17 in first substrate 12. This is shown in FIG. 2. Layer 17 was a blend of 90% of the PE 1325 EVA resin, and 10% of the PA 8112 antifogging agent masterbatch. Layer 16 of Example 2 was 0.4 mils in thickness; layer 17 was 1.0 mils, and layer 18 was 0.6 mils. The second substrate 14 of Example 2 had a thickness of 0.5 mils. The total final laminate thickness was 2.5 mils.

The inventors have found that the laminate described in Example 2 showed an intersubstrate bond strength, i.e. the bond between the first substrate 12 and second substrate 14, of 2.8 lbs/inch. This compares with the bond strength of an identical material, but without the corona pre-treatment step, of less than about 0.5 lb/inch. The bond strengths were tested 72 hours after lamination.

EXAMPLE 3

A laminate like that of Example 2 is made, but including a linear low density polyethylene/antifogging agent masterbatch blend (90%/10%) in layer 17 (see FIG. 2) instead of the EVA/antifogging agent blend of Example 2.

EXAMPLE 4

A laminate like that of Example 2 is made, but including a blend of 90% very low density polyethylene and 10% antifogging agent masterbatch in layer 16 (see FIG. 2) instead of the blend of LLDPE/antifogging agent of Example 2. The laminate of Example 3 also includes a blend of 90% very low density polyethylene and 10% antifogging agent masterbatch in layer 17, instead of the EVA/antifogging agent of Example 2.

EXAMPLE 5

A laminate like that of Example 2 is made, but including a metallocene catalyzed polymer/antifogging agent masterbatch blend (90%/10%) in layers 16 and 17 (see FIG. 2) instead of the LLDPE/antifogging agent blend of layer 16, and the EVA/antifogging agent blend of layer 17, of Example 2.

Various changes and modifications to the invention can be made by one skilled in the art without departing from the scope of the claims as presented below. The first substrate can be made by lamination or extrusion coating techniques as well as coextrusion. The second substrate can be cast or blown by conventional means.

What is claimed is:

1. A process for making a laminate comprising:

blending a polyolefin and an antifogging agent;

coextruding the blend with a bonding layer of a polyolefin to form a first substrate;

corona pre-treating an exposed surface of the bonding layer within a short time after the coextrusion step;

then winding up the first substrate onto a roll;

unwinding the first substrate;

corona treating the pre-treated surface of the first substrate;

applying an adhesive to the treated surface of the first substrate, or to a second substrate comprising a polyester or nylon; and adhering the second substrate to the treated surface of the first substrate.

2. A process for making a laminate comprising:

blending a polyolefin and an antifogging agent;

coextruding the blend with a second layer of a polyolefin, and a bonding layer of polyolefin to form a first substrate;

corona pre-treating an exposed surface of the bonding layer within a short time after the coextrusion step;

then winding up the first substrate onto a roll;

unwinding the first substrate;

corona treating the pre-treated surface of the first substrate;

applying an adhesive to the treated surface of the first substrate, or to a second substrate comprising a polyester or nylon; and adhering the second substrate to the treated surface of the first substrate.

* * * * *